United States Patent
Wachel

(10) Patent No.: US 6,522,825 B1
(45) Date of Patent: Feb. 18, 2003

(54) OPTICAL-TO-ELECTRICAL CONVERSION ON REAR-PANEL TRANSITION CARDS

(75) Inventor: Robert David Wachel, Altadena, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/607,898

(22) Filed: Jun. 30, 2000

(51) Int. Cl.[7] .................................................. G02B 6/00
(52) U.S. Cl. ........................................ 385/135; 359/159
(58) Field of Search .................................. 385/135, 136, 385/137, 24; 359/159

(56) References Cited

U.S. PATENT DOCUMENTS

| | | | | |
|---|---|---|---|---|
| 5,069,522 A | * | 12/1991 | Block et al. .................. 385/39 |
| 5,329,428 A | * | 7/1994 | Block et al. .................. 439/74 |
| 5,339,221 A | * | 8/1994 | Conroy-Wass et al. ...... 361/796 |
| 5,561,727 A | * | 10/1996 | Akita et al. ................... 385/53 |
| 5,883,998 A | * | 3/1999 | Stevens et al. ............. 385/134 |
| 5,980,312 A | * | 11/1999 | Chapman et al. ......... 439/540.1 |
| 6,028,769 A | * | 2/2000 | Zurek ......................... 361/704 |
| 6,058,235 A | * | 5/2000 | Hiramatsu et al. .......... 385/135 |
| 6,243,361 B1 | * | 6/2001 | McMillen et al. .......... 370/254 |
| 6,344,911 B1 | * | 2/2002 | Dailey et al. ............... 359/127 |

* cited by examiner

*Primary Examiner*—Brian Sircus
*Assistant Examiner*—Brian S. Webb
(74) *Attorney, Agent, or Firm*—Blakely, Sokoloff, Taylor & Zafman LLP

(57) ABSTRACT

A method and apparatus for improving fault tolerance of a midplane system is disclosed.

In one embodiment, the method and apparatus provide a rear optical interface on a transition card of the midplane system. The method and apparatus then allow a main card of the midplane system to access a fiber optic cable coupled to the rear optical interface via an optic transceiver and a data format transceiver on the transition card.

13 Claims, 3 Drawing Sheets

US 6,522,825 B1

OPTICAL-TO-ELECTRICAL CONVERSION ON REAR-PANEL TRANSITION CARDS

FIELD OF THE INVENTION

This invention relates to communication technologies generally and particularly to midplane systems.

BACKGROUND OF THE INVENTION

Freed from government restrictions in the telecommunication industry, traditional operators, such as the telephone companies, face intensive competition from a new breed of network operators, such as the wireless and the Internet service providers. In order to remain competitive, the traditional operators need platforms that allow them to quickly roll out services in response to changes in market conditions. On the other hand, because the new network operators often lack the resources of a traditional operator, they need equipment that is flexible, cost effective, readily maintainable and yet still compatible with the same packaging as traditional telecommunication systems.

Although desktop-class systems may have sufficient processing capabilities to drive applications such as Internet access, they lack the level of fault tolerance that is suitable for the mentioned telecommunication operators. Specifically, replacing a failed communications card in a desktop system takes significant amount of time. It involves turning off the system and removing the appropriate packaging. Additionally, this replacement process may also involve removing attached cables, fitting the replacement and reassembling the system.

One alternative solution is a prior art midplane system as shown in FIG. 1. In particular, chassis 100 contains midplane 102. Midplane 102 is a circuit board that provides sockets for plug-in cards such as main card 104 and transition card 106 to plug into. Unlike the desktop-class system, a midplane system thus allows for easy loading and removal of communication cards without having to tamper with the cabling and the assembly of the system.

Moreover, in a typical midplane system, main card 104 contains the processing engine and has a higher failure rate than passive components. Conversely, transition card 106 mostly provides Input/Output (hereinafter I/O) termination and has a lower failure rate. This deliberate separation of functionality is an attempt to maintain a high level of fault tolerance for the midplane system. More specifically, replacing transition card 106 likely involves reconfiguring I/O and rearranging physical cabling, which are both time-consuming and susceptible to errors. Therefore, implementing transition card 106 with a low failure rate is likely to result in infrequent changes of the card and a reduced probability of encountering undesirable delays and errors that are associated with the card changes. On the other hand, unlike transition card 106, swapping out main card 104 does not involve the mentioned reconfiguration and rearrangement. Thus, placing core processing on an easily exchangeable communication card, such as main card 104, helps to avoid disrupting operations of the midplane system.

However, a midplane system that communicates with optical networks has optical interfaces on main card 104. As a result, replacing main,card 104 would also involve rearranging physical cabling. As has been discussed above, this rearrangement leads to unwanted delay and errors. Hence, an improved method and apparatus is needed to address the fault tolerance issues of a midplane system discussed above.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and an apparatus for improving fault tolerance of a midplane system are disclosed. In the following description, numerous specific details are set forth in order to provide a thorough understanding of the present invention. However, it will be apparent to one of ordinary skill in the art that the invention may be practiced without these particular details. In other instances, well-known elements and theories, such as optical communication, optical-to-electrical and back to optical conversions, serial-to-parallel and back to serial conversions, Universal Test and Operational Physical Interface for Asynchronous Transfer Mode (hereinafter UTOPIA) bus, Compact Peripheral Component Interconnect (hereinafter CompactPCI) standard, etc. have not been discussed in special details in order to avoid obscuring the present invention.

Figure 1:
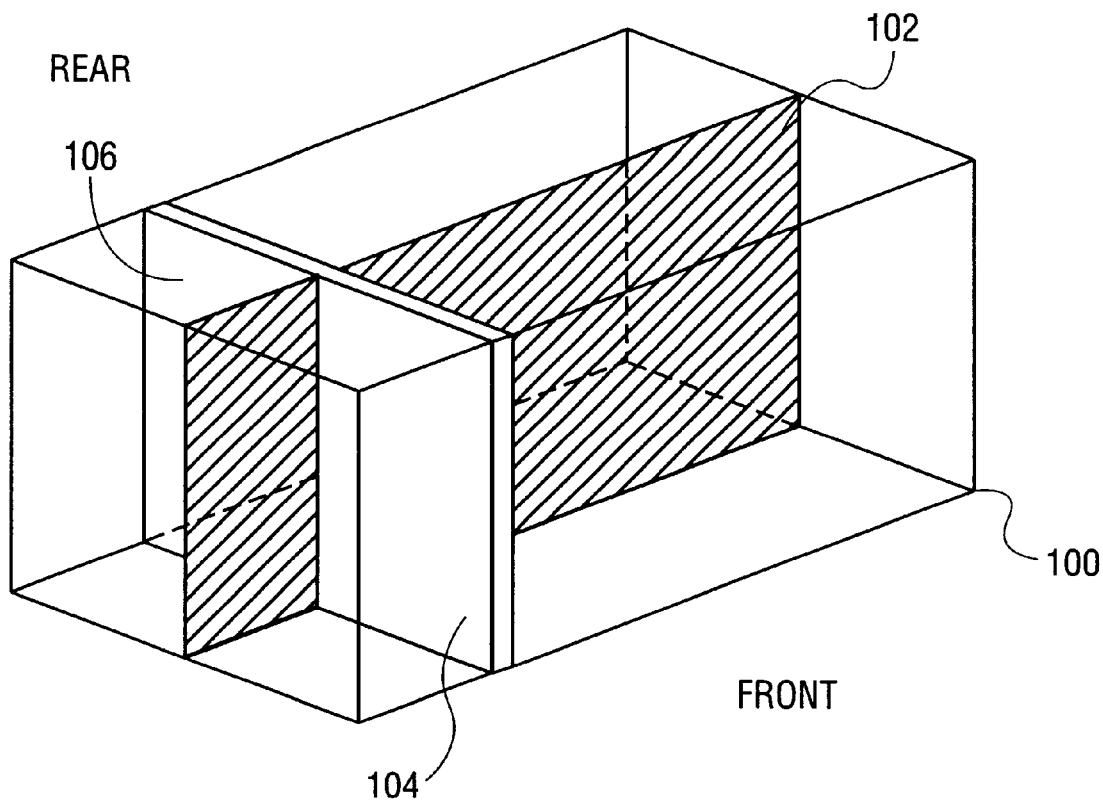
FIG. 1 illustrates a prior art midplane system.

Moreover, throughout the following discussions, the term, "a midplane system" refers to a system with a midplane, one or more main cards and one or more transition cards as shown in FIG. 1. As has been described in the Background section, "midplane" refers to a circuit board that provides sockets for plug-in cards to plug into. "Main card" contains the processing engine for the midplane system, and "transition card" mainly provides I/O termination. The term "rear" refers to the rear of a midplane system as shown in FIG. 1 in the following discussions. "CompactPCI" refers to a standard that is fully compatible with conventional desktop Peripheral Component Interconnect (hereinafter PCI). In addition, the boards and backplanes used by CompactPCI fit the same packaging as conventional telecommunication systems.

Figure 2:
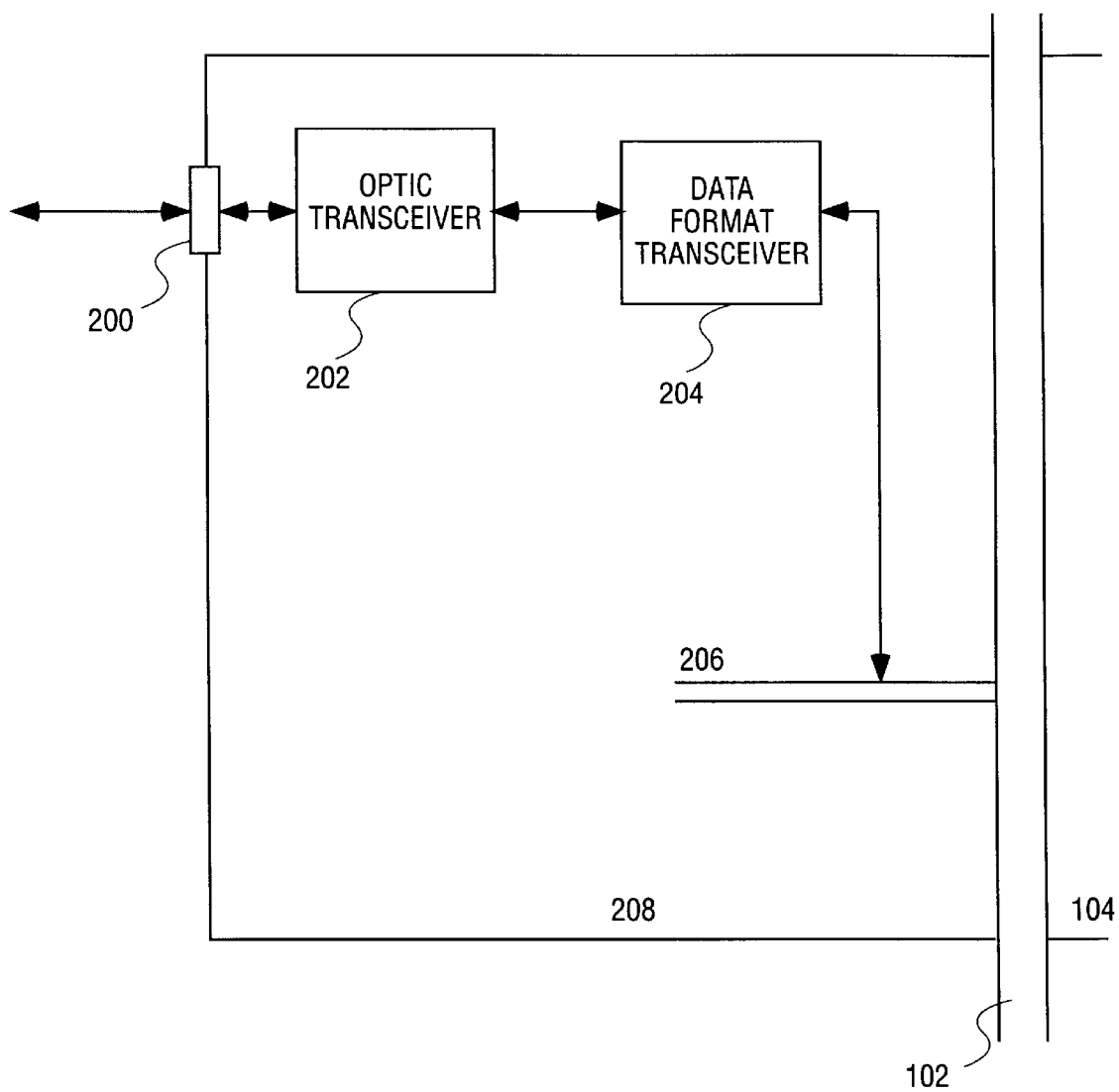
FIG. 2 illustrates a general block diagram of one embodiment of an improved transition card.

FIG. 2 illustrates a general block diagram of one embodiment of improved transition card 208. The embodiment contains rear fiber optic interface 200, optic transceiver 202, data format transceiver 204 and data bus 206. Rear fiber optic interface 200 couples to a fiber optic cable, which includes a bundle of glass threads. Each of these threads is capable of carrying data that are modulated onto light waves. These light waves are collectively referred to as an "optical signal" throughout the discussions.

In a receive path, or from rear fiber optic interface 200 to midplane 102, after rear fiber optic interface 200 relays the optical signal in the fiber optic cable to optic transceiver 202, optic transceiver 202 converts the optical signal to an electrical signal. In one embodiment, this converted electrical signal contains a serial stream of data. Then data format transceiver 204 converts the serial data stream into a parallel data stream and places the converted parallel stream of data on data bus 206. In one embodiment of improved transition card 208, the serial data stream operates under a different frequency than the parallel data stream. In one specific implementation, the serial data stream operates at 622 MHz and the parallel data stream at 50 MHz.

In a transmit path, or from midplane 102 to rear fiber optic interface 200, data format transceiver 204 converts parallel data stream on data bus 206 back to serial data stream. Then optic transceiver 202 converts the electrical signal that describes the serial data stream to an optical signal. It should be noted that optic transceiver 202 and data format transceiver 204 operate with various types of protocols and data formats. Some examples are, but not limited to, fiber channel, Synchronous Optical Network (hereinafter SONET), Wavelength Division Multiplexed (hereinafter WDM) data, Dense WDM (hereinafter DWDM) data, etc.

Additionally, in one embodiment of improved transition card 208, data bus 206 has sufficient bandwidth to accommodate a number of sets of parallel data streams. In other words, improved transition card 208 can accommodate more than one fiber optic inputs. One specific implementation of data bus 206 utilizes Universal Test and Operational Physical Interfaces for As (UTOPIA) bus. Moreover, because data bus 206 is communicatively coupled to midplane 102 as shown in FIG. 2, it could contain data that are originated from and destined for main card 104.

Figure 3:
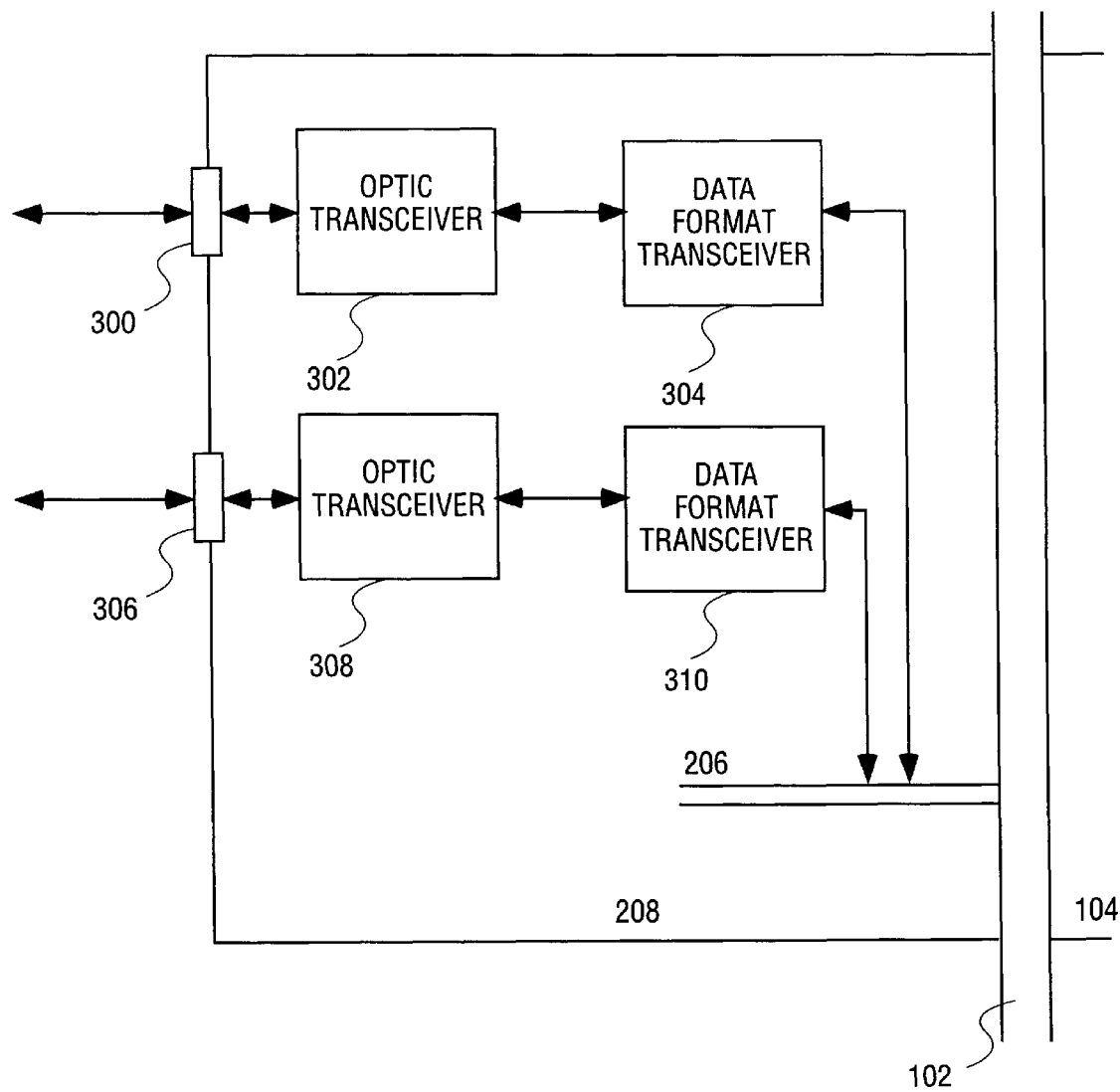
FIG. 3 illustrates a general block diagram of another embodiment of an improved transition card.

FIG. 3 illustrates a general block diagram of another embodiment of improved card 208. In an embodiment, the improved transition card 208 includes a first rear fiber optic interface 300, a second rear fiber optic interface 306, a first optic transceiver 302, a second optic transceiver 308, a first data format transceiver 304, a second data format transceiver 310, and data bus 206. In addition to the data conversion functionality discussed above, data format transceivers 304 and 310 in this embodiment further provide: for an add/drop feature. This add/drop capability allows extracting or inserting one signal from another signal. For instance, data format transceiver 304 extracts data from the output of data format transceiver 310 and adds the extracted data to its outgoing data stream. Although two sets of optic/data format transceivers have been used to illustrate one particular application of the add/drop functionality, one ordinarily skilled in the art may implement any number of sets to handle other situations without exceeding the scope of improved transition card 208.

When the prior art midplane system illustrated in FIG. 1 is equipped with improved transition card 208 to communicate with optical networks, the midplane system is likely to maintain a high level of fault tolerance. More specifically, as has been mentioned in the Background section, level of fault tolerance can be evaluated on a number of parameters. Some examples are, but not limited to, the mean time to repair (hereinafter MTTR) and the, mean time between failures (hereinafter MTBF). Equipping a midplane system with improved transition card 208 reduces MTTR, because removal of a communication card with a higher failure rate, such as main card 104, no longer involves tampering with I/O configuration and disconnecting physical fiber optic cables.

Furthermore, one embodiment of a midplane system is implemented in accordance to CompactPCI standard. Such implementation not only reduces MTTR, but may also increase MTBF. First, CompactPCI cards allow for easy removal from and loading into a chassis and thus result in a reduced MTTR. Second, the power and signal pins on a CompactPCI connector are staged as to support hot swapping, a feature that increases MTBF. More particularly, hot swapping ensures that the activation of power and signal of a CompactPCI card does not disrupt the operations of its surrounding boards. As has been demonstrated, a CompactPCI midplane system together with improved transition card 208 is likely to maintain a high level of fault tolerance.

Although specific examples have been provided to illustrate the operations of an improved transition card and a midplane system that contains the card, one with ordinary skill in the art may implement the illustrated system without all the disclosed details. For example, an ordinarily skilled artisan may further divide or combine the functionality of the discussed components in an improved transition card without exceeding the scope of the present invention.

Thus, a method and apparatus for improving fault tolerance of a midplane system has been disclosed. Although an improved transition card has been described particularly with reference to the figures, it may appear in any number of other configurations. It is further contemplated that many changes and modifications may be made by one of ordinary skill in the art without departing from the spirit and scope of the present invention.

What is claimed is:

1. An improved transition card of a midplane system, comprising;
   a rear fiber optic interface to couple to a fiber optic cable;
   an optic transceiver, coupled to the rear fiber optic interface, to provide conversion between an optical signal and an electrical signal;
   a data format transceiver, coupled to the optic transceiver, to provide conversion between a first data format and a second data format; and
   a data bus, coupled to the data format transceiver, to communicate the electrical signal in the second data format from a main card to the transition card via a midplane of the midplane system, wherein the midplane is discrete from both the transition card and the main card, the midplane to allow either card to be removed from the midplane without substantially physically disturbing the other card.

2. The improved transition card according to claim 1, in a receive path, further comprising:
   a. the optic transceiver to convert the optical signal on the fiber optic cable to the electrical signal; and
   b. the data format transceiver to transform the electrical signal from the first data format to the second data format.

3. The improved transition card according to claim 1, in a transmit path, further comprising:
   a. the data format transceiver to transform the electrical signal on the data bus from the second data format to the first data format; and
   b. the optic transceiver to convert the electrical signal in the first data format to the optical signal.

4. The improved transition card according to claim 1, wherein the midplane system adheres to CompactPCI standard.

5. The improved transition card according to claim 1, the first data format comprises a serial data stream and the second data format comprises a parallel data stream.

6. A midplane system, comprising:
   a. a chassis; and
   b. a midplane within the chassis to couple to an improved transition card and a main card, the improved transition card further comprises:
      a rear fiber optic interface to couple to a fiber optic cable;
      a optic transceiver, coupled to the rear fiber optic interface, to provide conversion between an optical signal and an electrical signal;
      a data format transceiver, coupled to the optic transceiver, to provide conversion between a first data format and a second data format; and
      a data bus, coupled to the data format transceiver, to communicate the electrical signal in the second data format with the main card via the midplane, wherein the midplane is discrete from both the transition card and the main card, the midplane to allow either card to be removed from the midplane without substantially physically disturbing the other card.

7. The midplane system according to claim 6, the improved transition card in a receive path further comprising:
   a. the optic transceiver to convert the optical signal on the fiber optic cable to the electrical signal; and
   b. the data format transceiver to transform the electrical signal from the, first data format to the second data format.

8. The midplane system according to claim 6, the improved transition card in a transmit path further comprising:
   a. the data format transceiver to transform the electrical signal on the data bus from the second data format to the first data format; and
   b. the optic transceiver to convert the electrical signal in the first data format to the optical signal.

9. The midplane system according to claim 6, the midplane system further adheres to CompactPCI standard.

10. The midplane system according to claim 6, the first data format comprises a serial data stream and the second data format comprises a parallel data stream.

11. An improved transition card of a midplane system, comprising:

an optic transceiver to provide conversion between au optical signal and an electrical signal;

a first data format transceiver to provide conversion between a first data format and a second data format, wherein the first data format transceiver also having a signal add/drop module, the first data format transceiver coupled to the optic transceiver; and a data bus, coupled to the first data format transceiver, to communicate the electrical signal in the second data format from a main card to the transition card via a midplane of the midplane system, wherein the midplane is discrete from both the transition card and the main card, the midplane to allow either card to be removed from the midplane without substantially physically disturbing the other card.

12. The improved transition card according to claim 11, wherein the first data format comes a serial data stream and the second data format comprises a parallel data stream.

13. The improved transition card according to claim 11, further comprising:
   a second data format transceiver, wherein the signal add/drop module to insert a first signal from the first data format transceiver into a second signal in the second data format transceiver.

* * * * *